May 12, 1959  E. L. SCHLAGE  2,886,089
THREADED MEMBER WITH PLASTIC RING HAVING FLEXIBLE LOCKING FINS
Filed Oct. 1, 1954  2 Sheets-Sheet 1
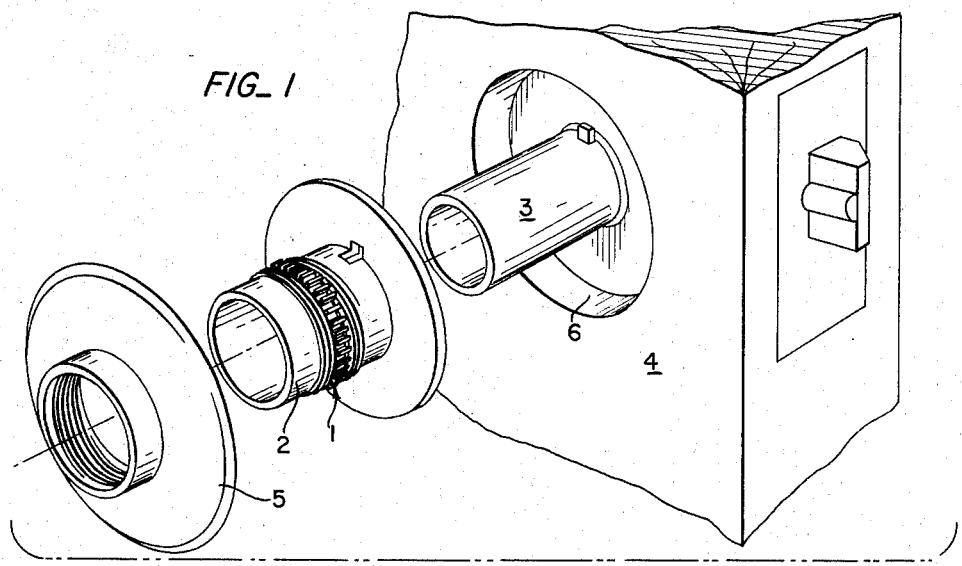
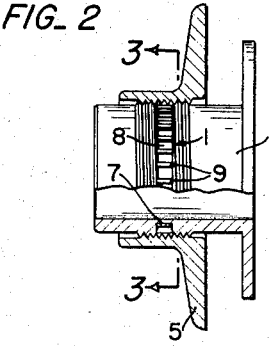
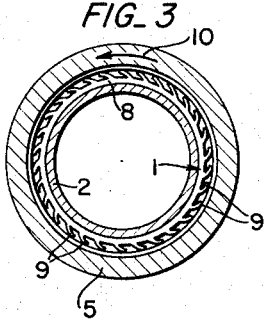
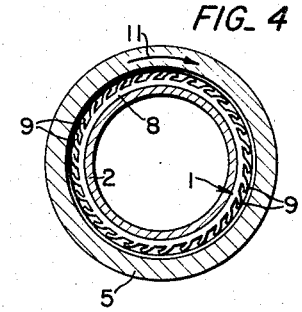
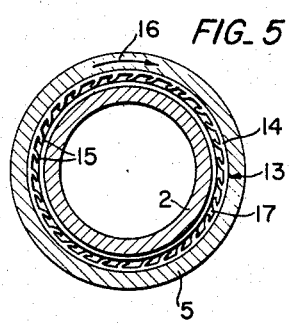
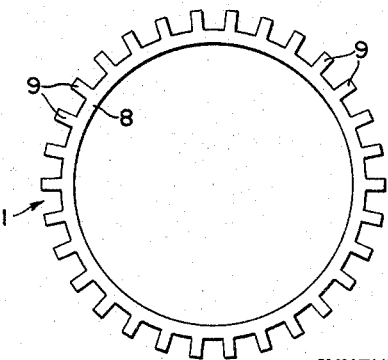
INVENTOR.
ERNEST L. SCHLAGE
BY
*Boyken, Mohler & Wood*
ATTORNEYS May 12, 1959 E. L. SCHLAGE 2,886,089
THREADED MEMBER WITH PLASTIC RING HAVING FLEXIBLE LOCKING FINS
Filed Oct. 1, 1954 2 Sheets-Sheet 2
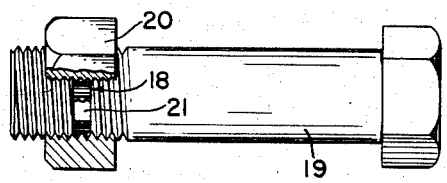
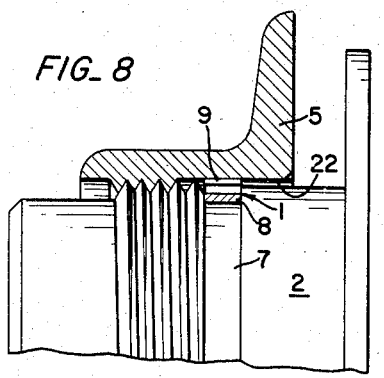
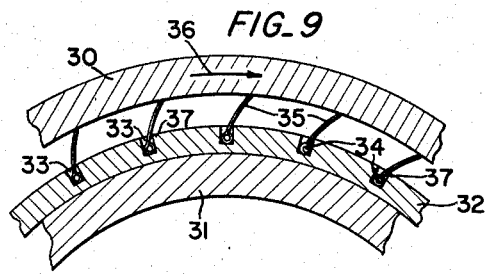
INVENTOR.
ERNEST L. SCHLAGE
BY
ATTORNEYS United States Patent Office 2,886,089
Patented May 12, 1959

2,886,089

THREADED MEMBER WITH PLASTIC RING HAVING FLEXIBLE LOCKING FINS

Ernest L. Schlage, Burlingame, Calif., assignor to Schlage Lock Company, a corporation Application October 1, 1954, Serial No. 459,655

1 Claim. (Cl. 151—25)

This invention relates to the provision of means for resisting the unscrewing or loosening of one threaded member from the other member that is in threaded engagement therewith.

An example is a bolt and nut and in one form herein described and illustrated in the drawings the nut comprises a rose threadedly mounted on the protruding hub of a door lock chassis for tightening the rose against the outer surface of the door carrying said chassis. In this instance, and in many other instances, where the rose or outer member is subjected to frequent rotational forces, as are incident to turning the door knob, the necessity arises for a hidden, rotation preventing device to prevent the unintentional loosening of the outer member, but which device will not preclude the intentional loosening thereof, and which device will not be injured or injure either of the threaded members when intentionally loosened or tightened.

Heretofore, one attempt to solve the problem of the accidental or unintentional unscrewing of the rose from the hub of a lock has been to provide the door engaging side of the rose with projections intended to dig into the door surface. This attempted solution had the obvious objection of marring the outer surface of the door, and it proved unsatisfactory for accomplishing the intended result for the reason that the door, in many instances, would gradually shrink away from the projections.

Other attempts that have been made were unsatisfactory because the structure employed resulted in the nut locking means being rendered inoperative after one use, or else one of the threaded members was injured. In the case of a rose and a hub, it may be necessary to unscrew the rose a number of times.

Still other attempts have been made that employ visible locking means for the rose, or special covers for locking means, with the result that the outward appearance is displeasing.

It is therefore an important object of this invention to provide a device for preventing rotation between two concentric members, which device is hidden from exterior view.

It is another object of this invention to provide a device for preventing rotation between two threadedly engaging members, which device is reversible and re-usable without losing its rotation preventing characteristics.

Still another object of this invention is the provision of a deformable friction ring for resisting rotation in one direction between two threadedly engageable, rotatable members.

It is a further object of this invention to provide a toothed ring, insertable between and concentric with two threaded members for resisting unscrewing of one of such members with respect to the other.

Yet another object of this invention is the provision of a rotation preventing device for use with a pair of threaded members, which device is easy to manufacture and is automatic in its action of releasably locking one with the other against accidental loosening.

Other objects and advantages will become apparent from the following description taken in connection with the accompanying drawings in which:

Fig. 1 is an exploded, perspective view of a portion of a door, a door lock chassis, hub, and rose, showing the preferred embodiment of the friction device of this invention assembled on said hub;

Fig. 2 is a partly sectional and partly elevational view of the assembled hub, rose, and friction device of Fig. 1;

Fig. 3 is a cross-sectional view, taken along line 3—3 of Fig. 2, showing deflection of the friction device of Fig. 1 as the rose is screwed on the hub, the direction of rotation being denoted by the arrow;

Fig. 4 is a cross-sectional view, similar to Fig. 3, but showing the deflection of the friction device of Fig. 1 as the rose is unscrewed from the hub, the direction of rotation being denoted by the arrow;

Fig. 5 is a cross-sectional view, similar to Fig. 3, but showing a modified form of friction device assembled in the rose;

Fig. 6 is an enlarged plan view of the friction device of Fig. 1;

Fig. 7 is a side elevational view of a bolt and nut, with the nut partly broken away to show a friction device similar to that shown in Fig. 1 associated with said bolt;

Fig. 8 is an enlarged side elevational view similar to Fig. 2 but showing a modified placement of the friction device;

Fig. 9 is a greatly enlarged, partial, cross-sectional view similar to Fig. 3 showing a second modified form of friction device.

In detail, the preferred friction ring of this invention, generally designated 1, is shown in Fig. 1 associated with an externally threaded, flanged hub 2 of a door lock chassis 3. Said chassis is conventionally mounted in a door 4, hub 2 is axially slipped over and secured to chassis 3, and an internally threaded rose 5 is adapted to be threaded on said hub. Rose 5 is provided for the purpose of covering the hole 6 through which chassis 3 is inserted into door 4.

Since rose 5 is frequently subjected to rotational forces applied by anyone turning the door knob (not shown) it is necessary that steps be taken to prevent rose 5 from backing off from door 4 and thereby becoming loose. To accomplish this result hub 2 is circumferentially recessed, as at 7 (Fig. 2), intermediate the ends of its threads to permit insertion of ring 1 therein.

Ring 1 may be formed of any suitable flexible, resilient material which will withstand repeated deflection. Flexible vinyl has been found most suitable for this use since it does not split upon nicking of its edges as does Celluloid and the like. In the particular installation shown it is also necessary that ring 1 be oil resistant, not affected by heat, and long-lived. It has been found that when the aforementioned flexible vinyl is molded at 320° F. it has these desirable properties. Molding at too high a temperature causes such material to become brittle and not as effective in use.

In referring to Fig. 6 it will be seen that ring 1 comprises a solid, internally smooth ring 8 having integrally molded teeth 9 extending radially therefrom. Teeth 9 preferably have parallel sides and flat, tangent tops or outer ends. Ring 8 is of such a width and diameter to snugly fit into recess 7 (Fig. 2) and is slightly stretched so that its internal surface frictionally grips the bottom of said recess. When friction ring 1 is in the position shown in Figs. 1, 2 teeth 9 extend outwardly of recess 7 to a diameter slightly greater than the minor or root diameter of the threads of hub 2. Hence, when rose 5 is threaded onto hub 2 (the direction of rotation being shown by arrow 10 in Fig. 3) the threads in said rose deflect teeth 9 in the direction of rotation of rose 5 (Fig. 3). Because of their flexibility teeth 9 bend easily in the direction of rotation and offer little resistance to the tightening of rose 5 against door 4, as previously described.

However, when force is applied to rose 5 to rotate it in the opposite direction (denoted by arrow 11 in Fig. 4), the outer corners of teeth 9 are wedged into tight frictional engagement with the threads in said rose by their inherent resiliency and thereby resist the unscrewing of rose 5 from hub 2. The inner surface of ring 8 will not slip with respect to hub 2 partially because of its tight fit therewith and additionally because of the force applied to teeth 9 by the attempted reverse rotation of rose 5. This latter force, it will be seen, acts on a line between a radial and a tangential line to hub 2 and thereby forces ring 8 into tighter engagement with said hub.

Sufficient force may be applied to rose 5 in the direction of arrow 11 to bend teeth 9 backwards from the position shown in Fig. 3 to permit purposeful loosening of rose 5 (Fig. 4). The resistance of teeth 9 is sufficient to prevent ordinary, accidental rotation of rose 5 and the previously described unscrewing of said rose may be accomplished only by the application of substantial force.

Hence, under normal circumstances, ring 1 provides a device for preventing rotation between a pair of concentric members and comprises a ring of resilient material frictionally engagable by one of such members when substantially concentric therewith and having extending teeth deflectable by the other of such members in the direction of original rotation of such other member whereby when the other member tends to rotate in the opposition direction such teeth resist deflection in the opposition direction and thereby prevent such opposite rotation.

In the modification shown in Fig. 5 ring 13 is substantially similar to but inside-out from ring 1. Ring 13 comprises a solid, externally smooth ring 14 of resilient material adapted to be inserted in a recess 17 in rose 5 and having inwardly extending teeth 15. When rose 5 is threaded onto hub 2 teeth 15 are deflected opposite the direction of rotation of said rose (arrow 16) but perform the similar function of resisting reverse rotation by engaging the threads on hub 2, as previously described.

In Fig. 7 a friction ring 18, similar in all respects to ring 1, is shown in use with a conventional bolt 19 and nut 20 combination. Bolt 19 may be recessed as at 21 for receiving ring 18 and such ring similarly prevents reverse threading of nut 20 as previously described.

Fig. 8 illustrates a rose 5 and hub 2 combination similar to that shown in Fig. 2, but in which recess 7 is provided at one end of the threads on hub 2. Friction ring 1 resides in recess 7 but the outer ends of teeth 9 engage the smooth bore 22 of rose 5 rather than the threads thereof. The rotation resisting action of ring 1 is, in this case, similar to that previously described; and it is therefore obvious that the placement of ring 1 with respect to the threads of the rotary members is unimportant. As long as teeth 9 are deflected by and bear on a surface of one of the rotary members they will perform their described function. It is also obvious that ring 1 could as well be placed on the outer, smooth surface of hub 2, or any like shaft, the only requirement being that said ring be interposed between the two rotary members.

Another modification of the device of this invention is shown in Fig. 9 interposed between outer member 30 and inner member 31. The device of Fig. 9 comprises a continuous ring 32 formed with a plurality of axially extending, outwardly opening recesses 33. Hingedly connected to ring 32, as by pivot pins 34, in recesses 33 and extending outwardly therefrom are a plurality of resilient teeth 35. Teeth 35 are of greater extent than the spacing between members 30, 31 so that upon rotation of member 30 in the direction of arrow 36, teeth 35 are bent in the direction of such rotation. Shoulders 37, provided by the upper edge of recesses 33, limit the swinging of teeth 35 through a small arc and form a fulcrum for the bending of said teeth to the shape shown in Fig. 9.

In a manner similar to that previously described teeth 35 resist rotation of member 30 in a direction opposite arrow 36 by wedging themselves between member 30 and ring 32 (which is backed by member 31). If a large force is applied to rotate member 30 in the reverse direction teeth 35 may be forced to bend backwards to permit such rotation. This action, however, is similarly restricted to a case where a large force is applied to purposely reverse member 30.

Ring 32 and teeth 35 are therefore reversible in operation and the force required for such reversibility may be varied by varying the flexibility of ring 32. If ring 32 is made of rubber or the like, teeth 35 may be forced radially inwardly thereby facilitating the reverse rotation of member 30. It is obvious that teeth 35 may be otherwise hingedly connected to ring 32 than by the specific means shown.

Although the invention has been described and illustrated in detail, such is not to be taken as restrictive thereof since it is obvious that modifications could be made therein without departing from the spirit and scope of the invention.

I claim:

A device for frictionally resisting rotation between two threaded members including an externally threaded member and an internally threaded member, a groove formed in the surface of said externally threaded member, a ring of flexible plastic material, means for frictionally securing the ring in the groove against rotation, said ring including a plurality of spaced circumferential radially extending fins formed on the exterior surface of the ring, and extending at least beyond the root diameter of the externally threaded member, said fins having an axial width of at least the pitch of the threads so as to be engaged and bent in the direction of relative rotation of the internally threaded member to frictionally resist relative rotation of the said threaded members in the opposite direction, said fins adapted to be deformed and bent in a reverse direction only when considerable force is applied to reverse the direction of rotation of the said threaded members.

References Cited in the file of this patent

UNITED STATES PATENTS

| 589,599 | Hardy | Sept. 7, 1897 |
| 1,809,301 | Ladd | June 9, 1931 |
| 1,809,620 | Cole | June 9, 1931 |
| 2,335,367 | Thompson | Nov. 30, 1943 |
| 2,676,508 | Erickson | Apr. 27, 1954 |
| 2,723,699 | Coates | Nov. 15, 1955 |

FOREIGN PATENTS

| 79,904 | Sweden | Jan. 8, 1935 |